(No Model.)
A. C. EGGERS.
SYRINGE.
No. 391,696. Patented Oct. 23, 1888.
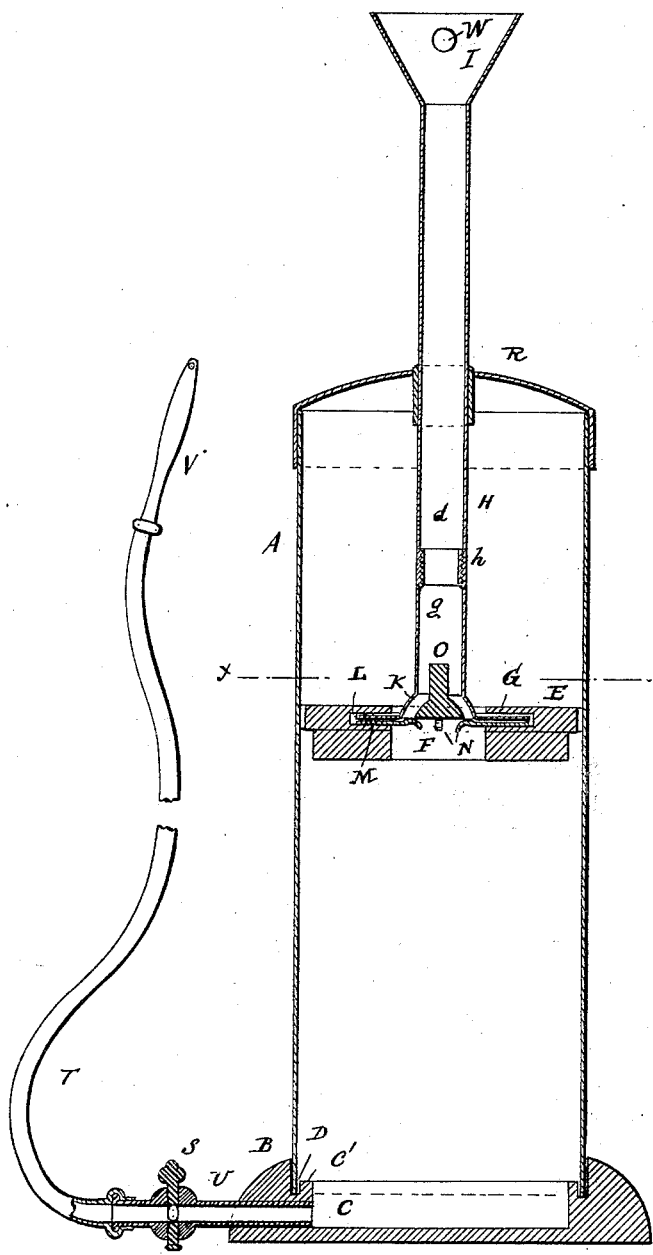
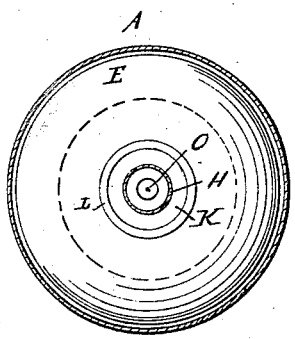
WITNESSES:
Henry Huber.
Carl Kraz.
INVENTOR.
Anton C. Eggers,
BY
Joepel & Raegener,
ATTORNEYS.

UNITED STATES PATENT OFFICE.

ANTON C. EGGERS, OF NEW YORK, N. Y.

SYRINGE.

SPECIFICATION forming part of Letters Patent No. 391,696, dated October 23, 1888.

Application filed January 12, 1888. Serial No. 260,536. (No model.)

*To all whom it may concern:*

Be it known that I, ANTON C. EGGERS, of the city, county, and State of New York, have invented certain new and useful Improvements in Combined Fountain and Pressure Syringes, of which the following is a specification.

This invention relates to certain new and useful improvements in fountain-syringes; and the object of my invention is to provide a new and improved fountain-syringe, which can also be used as a pressure-syringe, and which can be filled from the top.

The invention consists in the combination, with a cylinder having a top filling-opening, of a piston, piston-rod, and outlet-pipe.

The invention also consists in the construction and combination of parts and details, as will be fully described and set forth hereinafter, and then pointed out in the claims.

In the accompanying drawings, Figure 1 is a vertical transverse sectional view of my improved combined fountain and pressure syringe. Fig. 2 is a horizontal sectional view on the line *x x*, Fig. 1.

Similar letters of reference indicate corresponding parts.

The hard-rubber or metal cylinder A is secured in the soft rubber or other base, B, provided with the central cavity, C, the shoulder C', and the annular groove D in the shoulder, into which annular groove the lower end of the cylinder A is inserted. The flat piston or plunger E, fitting closely in the cylinder A, is provided with the central opening, F, and with the annular groove G in the sides of said opening. The piston-rod H is made tubular, and is provided at its upper end with the funnel-shaped enlargement *l*, and at its lower end it is flared to form the valve-seat K, and from said flared part the annular flange L projects outward. The ring-shaped plate M has a series of bent prongs, N, projecting inward from the edges of its aperture, said prongs serving to support the valve O, which may be conical, with a stem, as shown, or may be a ball-valve. In place of the prongs N, the plate M may be provided with a spider-frame or other grating that supports the valve, but permits the liquid to pass. The plate M and the flange L are inserted in the annular groove G of the plunger, the flange L resting on the plate M; or, if desired, the said flange and plate may be united and inserted together, or the prongs N may be secured to the flange L or to the flared part of the tubular piston rod. The plunger E is to be made of soft rubber or any other suitable material. The piston-rod is composed of two sections, *d* and *g*, that are screwed together at *h* in such a manner that the outer surface of said piston-rod is smooth.

The cylinder A is provided with a cover, R, having a central aperture for guiding the piston-rod. The base B is provided with the outlet-tube U, provided with the hard-rubber cock S. On said tube U the flexible rubber tube or hose T is coupled, to which the nozzle V is applied. The funnel-shaped top *l* of the tubular piston-rod is provided with an aperture, W, to permit of hanging it on a nail or hook, and thus suspending the cylinder from said nail or hook.

The piston is raised and the cylinder is filled by pouring the injection or other solution or liquid through the tubular piston-rod into the cylinder. The valve being lowered, it permits the liquid to flow down between the prongs N. The cock S, which is closed during the time the cylinder is being filled, is then opened and the piston-rod pressed down, whereby the liquid is forced from the cylinder through the hose T and nozzle V. In this manner the syringe can be used as a pressure-syringe for making injections.

When the syringe is to be used as a fountain-syringe, it is filled in the manner described and suspended from a hook or nail in the manner described, or it can be placed upon a raised object. When used as a fountain-syringe, the air can enter through the tubular piston-rod as the liquid flows off. When the piston is raised and the cylinder filled, the upper piston-rod section, *d*, can be screwed off and the upper end of the lower section, *g*, closed by means of a suitable stopper. The filled cylinder can then be transported safely and the injection used at any time, thus adapting the improved syringe for use by travelers, &c.

Having thus described my invention, I claim as new and desire to secure by Letters Patent—

1. In a syringe, the combination, with a cylinder, of a piston fitting closely in the same, a tubular piston-rod on said piston, and an outlet-tube for the cylinder, substantially as shown and described.

2. In a syringe, the combination, with a cylinder, of a piston in the same, a tubular piston-rod on said piston, a funnel-shaped enlargement on the upper end of said piston-rod, and an outlet-tube for the cylinder, substantially as herein shown and described.

3. In a syringe, the combination, with a cylinder, of a cover having an aperture, a piston fitting closely in said cylinder, a tubular piston-rod on said piston, which tubular piston-rod is passed through the aperture in the cover, and an outlet-tube for the cylinder, substantially as herein shown and described.

4. In a syringe, the combination, with a cylinder, of a piston, a tubular piston rod composed of two sections screwed together, and an outlet tube for the cylinder, substantially as herein shown and described.

5. In a syringe, the combination, with a base having an annular groove in its top, a cylinder having its lower end inserted in said groove, a piston in the cylinder, a piston-rod on the piston, and an outlet-tube for the cylinder, subtantially as shown and described.

6. In a syringe, the combination, with a base having an annular groove in its top, of a cylinder having its bottom part inserted in said groove, a piston in the cylinder, a piston-rod on said piston, and an outlet-tube for the cylinder in said base, substantially as herein shown and described.

7. In a syringe, the combination, with a cylinder, of the piston E, having the annular groove G, the tubular piston H, having the flange L at its lower end, which flange is inserted in the groove G, a valve in the lower end of the tubular piston-rod, and an outlet-tube for the cylinder, substantially as shown and described.

In testimony that I claim the foregoing as my invention I have signed my name in presence of two subscribing witnesses.

ANTON C. EGGERS.

Witnesses:
OSCAR F. GUNZ,
CARL KARP.